July 18, 1961  J. H. KELLY  2,992,924
METHOD OF PREPARING A FOWL WING
Filed July 6, 1959
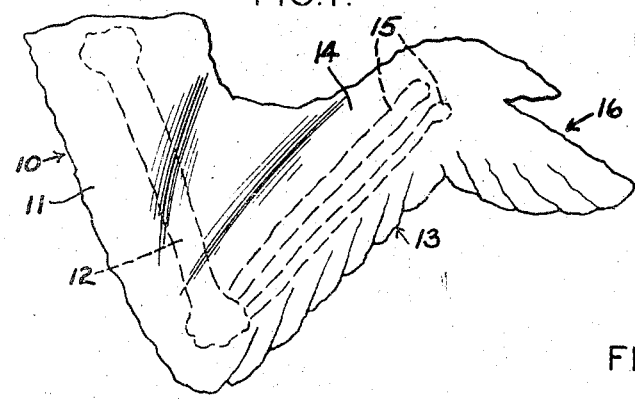
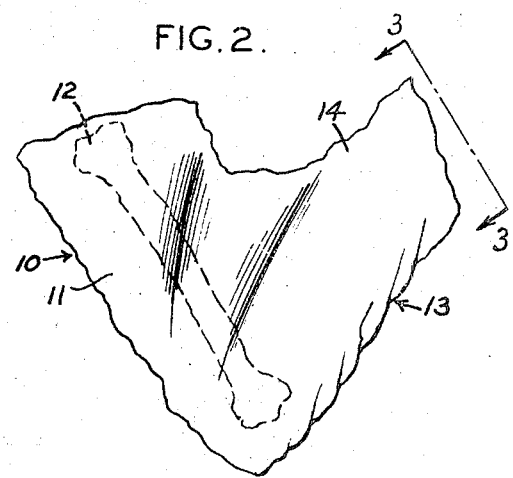
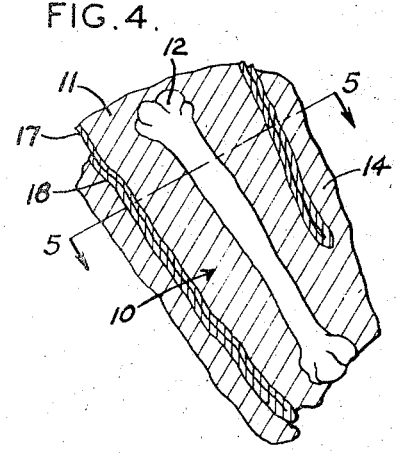
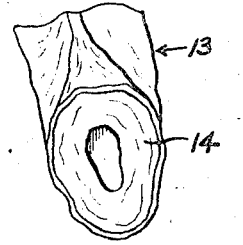
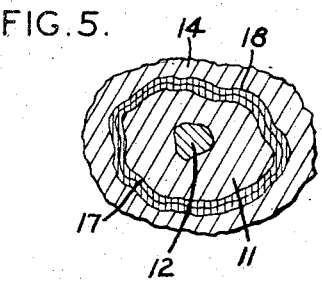
INVENTOR
JOSEPH KELLY
BY Cohn and Powell
ATTORNEYS.

United States Patent Office 2,992,924
Patented July 18, 1961

2,992,924
METHOD OF PREPARING A FOWL WING
Joseph H. Kelly, 8532 Oriole St., St. Louis 15, Mo.
Filed July 6, 1959, Ser. No. 825,139
3 Claims. (Cl. 99—107)

This invention relates generally to improvements in the method of preparing a fowl wing and to the improved product realized by such preparation.

Regarding poultry, many people look upon the wing in its usual state as one of the undesirable pieces of the fowl. This fact is particularly true in the case of the chicken or like size fowl where the wing is usually handled by the diner while eating. The obvious disadvantages and objections to the wing are that three members of the wing must be parted and handled separately, and that the bones of all members must be disposed of after the meat is consumed. In many instances, this manner of eating a fowl wing is decidedly untidy and inconvenient.

It is a major object of this invention to provide a method of processing a fowl wing, and particularly a chicken wing, to change its form so that substantially all the meat of such wing is disposed on one member and supported by a single bone. The meat of the resultant product can be eaten by handling only one piece of chicken instead of three pieces as is now required under the usual circumstances.

An important object is realized by providing a piece of fowl, such as chicken, that has substantially all of the meat of the wing disposed on the largest single bone of such piece for convenience in packaging, storing, cooking and in handling.

Another important object is realized by the method of preparing a fowl wing which will provide the finally processed product having the structure and advantages discussed previously.

Briefly, the method of preparing the fowl wing comprises the steps of removing the outermost part tip member of the wing from the intervening member, removing the bones of the intervening member, and pushing the meat of the intervening member onto the innermost member so that the meat of the innermost member and the intervening member is supported by the single bone of the innermost member.

For convenience, it is an important object to provide a final product in which the meat of the intervening member of the fowl wing is disposed over the meat of the innermost member and supported by the single bone of such innermost member. This product enables the meat of the fowl wing to be eaten by handling only one piece instead of three.

Still another important object is to provide an advance in the art of dressing poultry so that the wings of the fowl may be prepared by the butcher or other meat processor while such wings are attached to the fowl body.

It is an important object of the invention to provide a method of preparing a fowl wing which is simple and readily accomplished by anyone with a minimum of instruction, and which enables the meat processor to prepare a large quantity of processed wing products in a very short period of time.

The foregoing and numerous other objects and advantages of the invention will more clearly appear from the following detailed description of a preferred embodiment, particularly when considered in connection with the accompanying drawing, in which:

FIG. 1 is a top plan view of a fowl wing, and particularly a chicken wing, showing such wing in its usual conditions;

FIG. 2 is a top plan view of the wing similar to FIG. 1, but illustrating the removal of the outermost or tip member and the removal of the pair of bones of the intervening member;

FIG. 3 is an end view of the intervening member as seen along line 3—3 of FIG. 2, illustrating the hollow interior of the intervening member after removal of the bones;

FIG. 4 is a cross-sectional view of the finished product after the meat of the intervening member has been rolled back inside out on said innermost member, and FIG. 5 is a cross-sectional view of the completed product as seen along line 5—5 of FIG. 4.

Referring now by characters of reference to the drawing, and first to FIG. 1, it is seen that the conventional chicken wing consists of three members. The first, or innermost member, generally indicated at 10, has its meat portion 11 disposed about and supported by a single bone 12. The second, or intervening member, referred to at 13, has its meat portion 14 integral with the meat portion 11 of first member 10 and disposed about and supported by a pair of bones 15. As is usual, one of the bones 15 is of smaller diameter than the other. The third, or outermost member, generally indicated at 16, is attached to the second member 13.

The third member 16 of the wing consists substantially of all bone with very little meat and has a large number of minute pin feathers. The first step in the method of processing the chicken wing is to remove the third member 16 at its joint with the second member 13, as is illustrated in FIG. 2. Nothing of any value is lost by this removal.

The second step in the method of processing is to remove the pair of bones 15 in the second member 13, also as is illustrated in FIG. 2. This boning action leaves the meat portion 14 of the second member 13 integrally connected with the meat portion 11 of the first member 10. The meat portion 14 of the second member 13 is now unsupported by any bone and is provided with a hollow interior, as is best seen in FIG. 3.

The next step is to push the meat portion 14 of the second member 13 inside out back over the meat portion 11 of first member 10 to provide the finished product, illustrated in FIG. 4. In this product, substantially all of the meat of the chicken wing is supported directly by the relative large single bone 12 of the first member 10. To more clearly illustrate the particular formation of the product, and the fact that the meat portion 14 of the second member 13 is turned inside out as it is pushed over onto the first member 10, the skin 17 of the first member 10 is shown contiguous to the skin 18 of the second member 13.

While the above described method is preferred, a slight modification in one step of the processing may be made. For example, after the third member 16 has been removed and the bones 15 have been withdrawn from the second member 13, the meat portion 14 of such second member 13 is severed from the meat portion 11 of the first member 10 at the joint between such members 10 and 13. Then, the meat portion 14 can be slipped over the meat portion 11 of first member 10 in the manner of a sleeve. In this embodiment, the skin 18 of the meat portion 14 is located on the outside of the finished product. In other words, the meat portion 14 of second member 13 is not turned inside out as it is pushed back onto the first member 10.

It is apparent that the above described method of processing the chicken wing can be carried out while the wing is attached to the chicken body, or with equal facility can be carried out after the wing has been detached from the body.

Although the invention has been described by making detailed reference to a preferred processing method and one modification thereof, and to the product formed by the method, such detail is to be understood in an instructive, rather than in any restrictive sense, many variants being possible within the scope of the claims hereunto appended.

I claim as my invention:

1. The method of preparing a fowl wing that has a first member with a bone, a second member joined to the first member and having a pair of bones, and a third member including bones joined to the second member, the method comprising the steps of severing the third member from the second member, removing the bones from the second member, and pushing the meat of the second member back over the meat of the first member so that the meat of the first and second members is supported by the humerus bone of the first member.

2. The method of preparing a fowl wing that has a first member with a single bone, a second member joined to the first member and having a pair of bones, and a third member including bones joined to the second member, the method comprising the steps of severing the third member from the second member at the joint between such members, removing the pair of bones from the second member yet leaving the meat of said second member joined to the meat of the first member, and pushing the meat of the second member inside out back over the meat of the first member so that the meat of the first and second members is supported by the single bone of the first member.

3. The method of preparing a fowl wing that has a first member with a single bone, a second member having a pair of bones joined to the first member, and a third member including bones joined to the second member, the method comprising the steps of removing the third member from the second member, removing the pair of bones from the second member, severing the meat of the second member at the joint of said first and second members, and then slipping the meat of the second member over the meat of the first member in the manner of a sleeve so that the meat of the first and second members is supported by the bone of the first member.

References Cited in the file of this patent

UNITED STATES PATENTS

| 1,433,628 | Knaust | Oct. 31, 1922 |
| 2,571,544 | Cutrera | Oct. 16, 1951 |
| 2,844,844 | Sieczkiewicz | July 29, 1958 |
| 2,853,389 | Luchese | Sept. 23, 1958 |

OTHER REFERENCES

"Culinary Arts Institute Encyclopedia Cook Book," 1948 by Ruth Berolzheimer, published by Culinary Arts Institute, Chicago, pp. 408, 409, 410, 411, 413, 441, and 444.